Oct. 6, 1953 — J. TREFIL — 2,654,561

STEM AND CLOSURE MEMBER CONNECTION

Filed June 15, 1949

Inventor.
James Trefil.
By Joseph O. Lang

Patented Oct. 6, 1953

2,654,561

UNITED STATES PATENT OFFICE 2,654,561

STEM AND CLOSURE MEMBER CONNECTION

James Trefil, Berwyn, Ill., assignor to Crane Co., Chicago, Ill.

Application June 15, 1949, Serial No. 99,289

4 Claims. (Cl. 251—31)

This invention relates to a stem and closure member connection. More especially, it is concerned with a unique method of attachment between the actuating mechanism, such as the stem and the closure member having therebetween a clamped diaphragm of the usual configuration.

At the outset, it should be understood that heretofore in connection especially with diaphragm valves, it has been difficult to effect a properly operating construction without special handling; that is, one which is sufficiently secure and easily assembled without damage to the diaphragm, particularly avoiding pinching or crimping of the diaphragm at vital points thereof.

Therefore, it is one of the more important objects of this invention to provide for a precision connection easily arranged between the valve actuating stem and the closure member with the diaphragm clamped therebetween, enabling even the inexperienced factory hand to assemble the device very accurately at a relatively critical point without interference with valve operation, and also without danger of injury to the diaphragm.

Another important object is to provide for a connection in which the diaphragm may be easily replaced or inspected frequently without requiring special gauging in the assembly of a replacement diaphragm.

Other important objects and advantages will become more readily apparent upon proceeding with the following description read in light of the accompanying drawings, in which.

Figure 1:
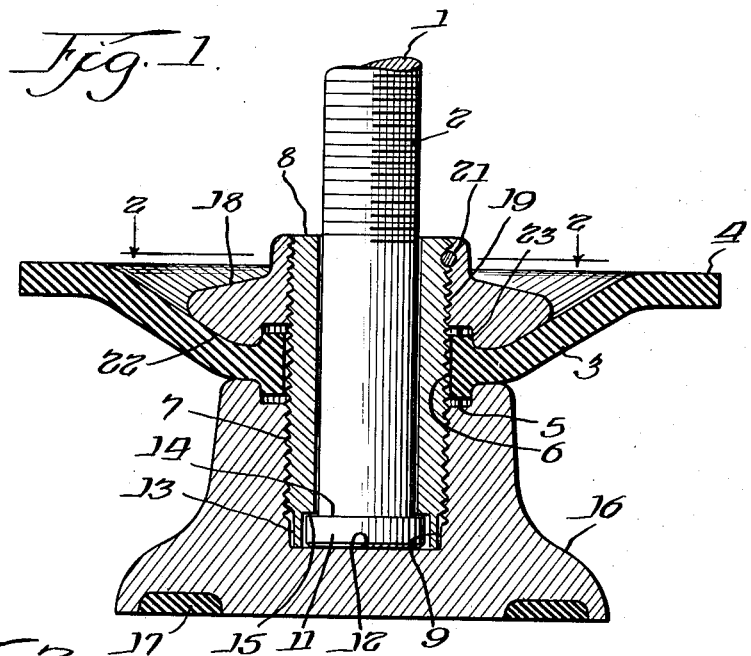
Fig. 1 is a fragmentary sectional assembly view of the novel connection forming my invention.
Figure 2:
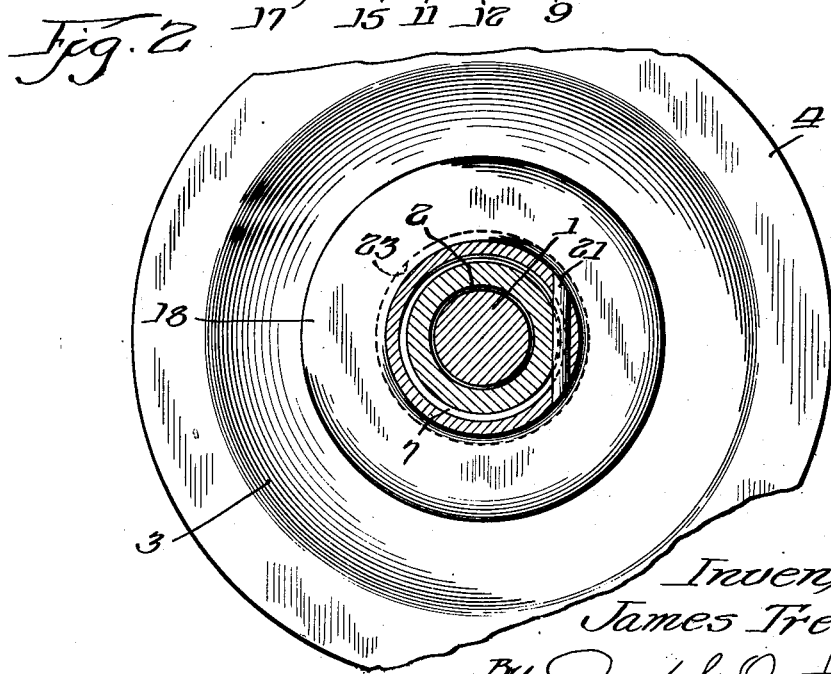
Fig. 2 is a plan elevation taken on the line 2—2 of Fig. 1.

Referring now to Fig. 1, the stem, generally designated 1, as shown in my co-pending application, Serial No. 601,021, filed June 22, 1945, now identified as Patent No. 2,504,057, issued April 11, 1950, is provided with the conventional stem threads 2 which by rotation of the stem 1 allows for the inward and outward pliant movement or flexing of the diaphragm 3. The latter member is normally clamped at its periphery in a fixed manner, as at 4, between a body and bonnet (neither of which is shown), to permit the desired flexing so that as the diaphragm is flexed upward or downward, the valve is open or closed. In the present illustration, the valve may be assumed as being in the closed position, the diaphragm being flexed downwardly. At its central portion, the diaphragm 3 is preferably provided with a thickened hub portion or collar 5 having the central aperture 6 surrounding a portion of the threads 7 of the threaded bushing 8. The threaded bushing 8 is received threadedly into the recess 9. Under the normal compression loads in effecting the diaphragm connection between the member 18 and the closure 16, it has been found that the hub aperture 6 actually is reduced in diameter, thereby to permit the threads 7 to bite into the rubber of the diaphragm and actually make a better fluid sealing connection.

It will be noted that the stem head 11 of the stem 1 is preferably grounded or supported on the surface 12 of the recess 9, as indicated. However, in order to provide the desired clearance between the ends of the threaded bushing 8 and the stem head 11, the threaded bushing 8 is provided with an end annular reduced extension 13, the length of such extension being slightly longer than the height of the stem head 11, thereby insuring the proper clearance between the shoulder surface 14 of the stem head and the surface 15 at the inner portion of the extension 13, as shown. Thus, it will be apparent that the accurate provision of a set clearance between the stem head and the inside recess portion is easily provided by making the length of the extension 13 predeterminedly as required, thereby insuring the proper clearance between the stem head and its surfaces 14 with relation to the shoulder 15. Below the latter shoulder, the stem head 11 is fitted to make the desired contact with the surface 12 of the closure member 16.

If desired, the latter member may be provided with the conventional seating insert 17.

Upon the upper surface portion of the diaphragm 3 and within the central area defined by the dished portion, as illustrated, the threaded bushing 8 is provided with the clamping nut 18, threadedly attached to the bushing 8, as at 19, and then pinned or otherwise fixed in place securely by means of the transversely extending pin 21. Preferably, the under surface portion 22 of the clamping nut or plunger 18 is recessed, as at 23, to receive the upper portion of the collar 5 of the diaphragm 3.

In assembling the nut 18 upon the threaded member 8, it will, of course, be apparent that this adjustment can be made very accurately, the threaded sleeve 8 holding the stem securely in place and also allowing for the plunger member 18 to compress the diaphragm and to prevent is being loosened after assembly. Yet, the stem head is closely received with precision in the space defined to allow desired rotation with a minimum of axial movement relative to the closure member.

Only a single preferred embodiment has been shown, but it should be clear that the invention is capable of embodiment in a variety of forms and other types of valves as set forth in the appended claims.

I claim:

1. A threaded connection for a diaphragm closure member of the character described, the combination including a closure member with a recessed portion, a threaded sleeve within said closure member recessed portion, a diaphragm on the closure member, a clamping nut mounted on the sleeve above the diaphragm, a stem therefor with an enlarged head end portion within said closure member recess and sleeve, the said diaphragm being clamped between the clamping nut and the closure member, the said sleeve having an end hollow extension cooperating with an end surface of the recess of the closure member, the depth of the hollow extension of the sleeve being slightly greater than the thickness of the enlarged head end portion of the stem whereby the said stem is maintained in predetermined movable relation axially to the said closure member and the threaded sleeve.

2. A threaded connection for a diaphragm closure member, the combination including a closure member with a recess formed therein, an externally threaded sleeve within the said closure member, a stem limitedly movable axially of the said sleeve within the recessed portion of the said closure member, a diaphragm on the said closure member, a clamping nut therefor, end means on said sleeve defining a stop between the said sleeve and recessed portion of the closure member for receiving said stem, the said clamping nut cooperating with the said sleeve whereby the said diaphragm is clamped in predetermined relation between the said clamping nut and the said closure member independently of the said stem mounting, the said stem having an end portion between the said closure member and a relieved portion of the said sleeve.

3. A threaded connection for a closure member, the combination including a closure member with a recessed portion, a threaded sleeve within said recess, a diaphragm on the closure member, a clamping nut on said sleeve and supporting an upper surface of the said diaphragm, the said diaphragm being clamped between the clamping nut and the closure member, a stem for said sleeve member, the said sleeve member having a reduced annular portion for contact with an inner end surface of said recessed portion of the said closure member to receive a shouldered end portion of the stem thereby to control the degree of axial movement permissible between the said stem and closure member.

4. A threaded connection for a diaphragm closure member and stem, the combination including a closure member, a threaded sleeve having a hollow extension in the said closure member, an apertured diaphragm on the said closure member, a clamping nut on said sleeve for the diaphragm, the said diaphragm being held in predetermined grip between the clamping nut and the closure member, whereby a central apertured portion of the diaphragm is engaged by threads of the said apertured sleeve, the said stem having an enlarged end portion substantially filling the hollow portion of the threaded sleeve extension but being limitedly movable axially between the hollow extension of the said sleeve and the end surface of a recessed portion of the said closure member receiving said hollow extension in abutting end relation.

JAMES TREFIL.

References Cited in the file of this patent

UNITED STATES PATENTS

| Number | Name | Date |
| --- | --- | --- |
| 1,346,737 | Atterberry | July 13, 1920 |
| 2,504,057 | Trefil | Apr. 11, 1950 |